United States Patent
Balasubramanian

(10) Patent No.: US 6,487,455 B1
(45) Date of Patent: Nov. 26, 2002

(54) DISTRIBUTED REAL TIME OPERATING SYSTEM

(75) Inventor: Sivaram Balasubramanian, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/410,159

(22) Filed: Sep. 30, 1999

(51) Int. Cl.[7] .............................................. G06F 15/16
(52) U.S. Cl. .............................. 700/2; 700/99; 709/201; 712/30
(58) Field of Search ................................ 700/2, 11, 19, 700/20, 29, 30, 97, 99; 709/201, 202; 705/8; 712/28, 30

(56) References Cited

U.S. PATENT DOCUMENTS

| | | | |
|---|---|---|---|
| 5,287,537 A | * 2/1994 | Newmark et al. | ........... 395/800 |
| 5,628,013 A | 5/1997 | Anderson et al. | |
| 5,838,968 A | 11/1998 | Culbert | |
| 5,887,143 A | * 3/1999 | Saito et al. | ............ 395/200.78 |

OTHER PUBLICATIONS

Krithi Ramamritham et al; "Efficient Scheduling Algorithms For Real–Time Multiprocessor Systems", IEEE Transactions On Parallel and Distributed Systems, vol. 1, No. 2, Apr. 1, 1990; pp. 184–194.

Chung M S et al; "Requirements Specification of Distributed Hard Real–Time Operating Systems"; Proceedings of the International Conference on Industrial Electronic, Control and Instrumentation (IECON), IEEE, Oct. 28–Nov. 1, 1991, vol. 1.

* cited by examiner

*Primary Examiner*—Paul P. Gordon
(74) *Attorney, Agent, or Firm*—John T. Pienkos; Alexander M. Gerasimow; William R. Walburn

(57) ABSTRACT

An operating system for distributed industrial controllers ensures the completion of enrolled application programs within a predetermined time span as is required for robust industrial control by preallocating dynamic and static hardware resources on a per application basis and in a manner that ensures execution of the application within the necessary time constraints. Portions of the distributed operating system may be distributed at particular hardware resources to provide necessary modeling for those hardware resources in making the commitments to resource bandwidths.

12 Claims, 3 Drawing Sheets

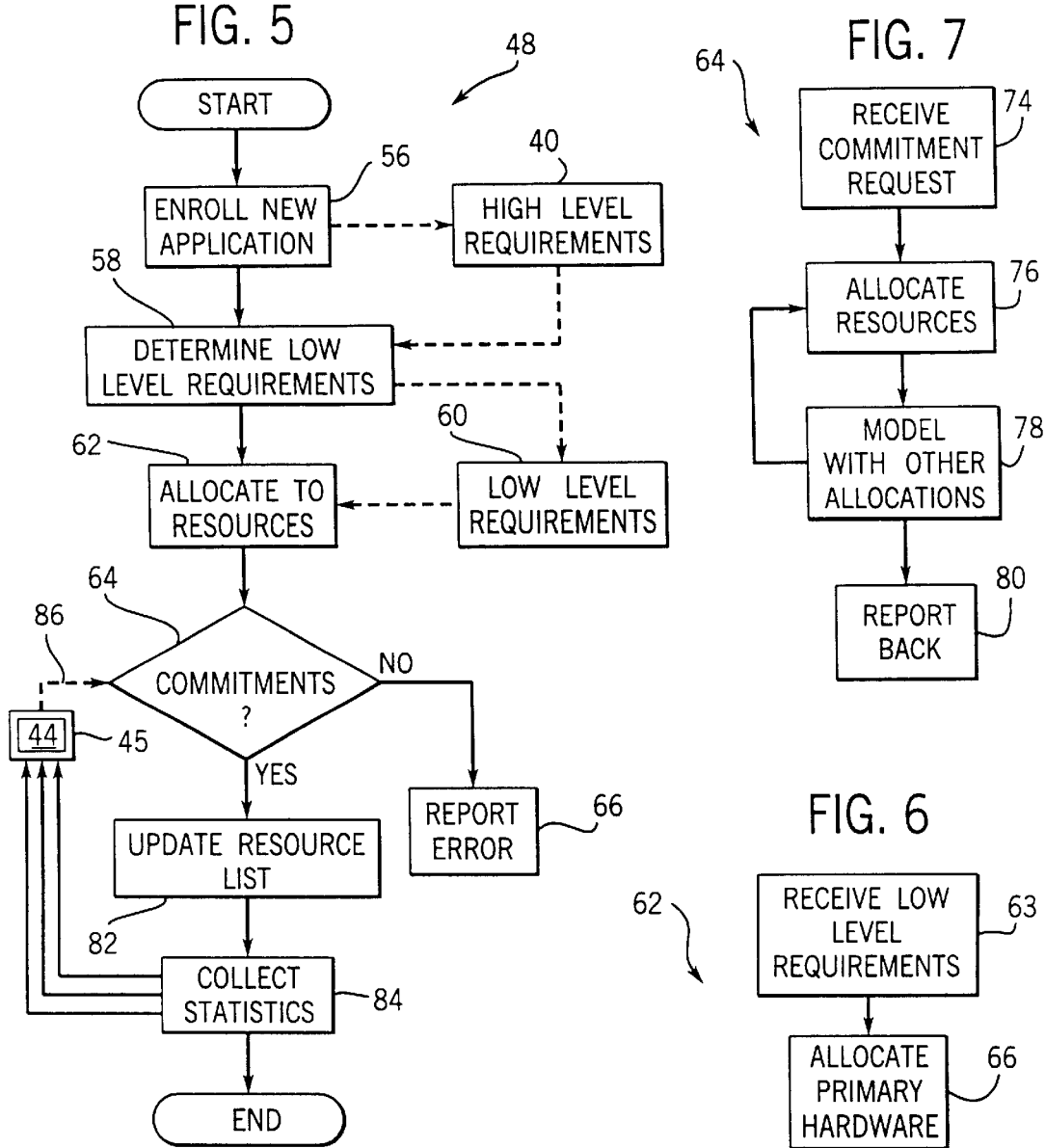

DISTRIBUTED REAL TIME OPERATING SYSTEM

BACKGROUND OF THE INVENTION

The present invention relates to industrial controllers for controlling industrial processes and equipment and more generally to an operating system suitable for a distributed industrial control system having multiple processing nodes spatially separated about a factory or the like.

Industrial controllers are special purpose computers used for controlling industrial processes and manufacturing equipment. Under the direction of a stored control program the industrial controller examines a series of inputs reflecting the status of the controlled process and in response, adjusts a series of outputs controlling the industrial process. The inputs and outputs may be binary, that is on or off, or analog providing a value within a continuous range of values.

Centralized industrial controllers may receive electrical inputs from the controlled process through remote input/output (I/O) modules communicating with the industrial controller over a high-speed communication network. Outputs generated by the industrial controller are likewise transmitted over the network to the I/O circuits to be communicated to the controlled equipment. The network provides a simplified means of communicating signals over a factory environment without multiple wires and the attendant cost of installation.

Effective real-time control is provided by executing the control program repeatedly in high speed "scan" cycles. During each scan cycle each input is read and new outputs are computed. Together with the high-speed communications network, this ensures the response of the control program to changes in the inputs and its generation of outputs will be rapid. All information is dealt with centrally by a well-characterized processor and communicated over a known communication network to yield predictable delay times, critical to deterministic control.

The centralized industrial controller architecture, however, is not readily scalable and with foreseeably large and complex control problems, unacceptable delays will result from the large amount of data that must be communicated to a central location and the demands placed on the centralized processor. For this reason it may be desirable to adopt a distributed control architecture in which multiple processors perform portions of the control program at spatially separate locations about the factory. By distributing the control, multiple processors may be brought to bear on the control problem reducing the burden on any individual processor and the amount of input and output data that must be transmitted.

Unfortunately the distributed control model is not as well characterized as far as guaranteeing performance of the controlled process as is required for real-time control. Delay in the execution of a portion of the control program by one processor can be fatal to successful real-time control and because the demand for individual processor resources fluctuates the potential for an unexpected overloading of a single processor is possible. This is particularly true when a number of different and independent applications programs are executed on the distributed controller where the application programs compete for the same set of physical hardware resources.

BRIEF SUMMARY OF THE INVENTION

The present invention provides an operating system for distributed real-time industrial control that ensures deterministic execution of multiple independent application programs. To do so the operating system pre-allocates hardware resources to each application by seeking a commitment from those hardware resources that they will meet specified timing constraints. The hardware resources determine whether they can meet the timing constraints by modeling the execution of the application together with the other applications. Generally, the commitments are initially based on worst case assumptions which are later modified by actual statistics of the process during its execution.

Specifically the present invention provides a real-time operating system for use with a control system having spatially separated hardware resources arranged in a topology. The operating system includes an application list indicating control application programs to be executed together with a required completion time and control hardware resources required by the control application programs. A resource list indicates control hardware resources and their allocation among control application programs. A commitment program portion of the operating system receives new control application programs and identifies control hardware resources from the resource list matching control hardware resources required by the new control application program. The commitment program then allocates a portion of the required completion time to each identified hardware resource and models execution of the new control application program with the other control application programs on the application list to ensure that allocated completion time for each hardware resource is met. The new control application program is enrolled on the application list if the completion time constraint is met and otherwise an error is reported.

Thus it is one object of the invention to provide a deterministic control environment with distributed hardware found in a distributed control system. By pre-allocating all hardware resources based on completion times for the application programs, acceptable response times are ensured.

The commitment program may model the execution of a control application program based on pre-determined pattern of repeated execution of the new application. During running of the control application program the commitment program may collect statistics on bandwidth usage and arrival time to modify the pre-determined pattern of repeated execution to better optimize use of hardware resources.

Thus it is another object of the invention to allow conservative but certain allocation of hardware resources which may later be improved based on actual statistics of resource use by the application program.

The hardware resources may be shared by scheduling and the resource list may include a schedule of use of the hardware resources by control application programs and the commitment program may model the schedules of the control application programs.

Thus it is another object of the invention to allow allocation of control application programs to share hardware resources such as networks which can be partitioned only in time through a scheduling system.

The modeling of the execution of a control application program with the other control application programs for each hardware resource may occur at the spatial location of the hardware resource.

Thus it is another object of the invention to provide each hardware resource with its own modeling capability so that a control system may be freely constructed of different hardware resources and yet be used with the distributed operating system.

The distributed operating system may include a network topology map indicating the topology of interconnections of the control hardware resources. Upon receiving a new control application program, "primary" control hardware resources may be identified matching the hardware resources required by the new control application program and "implicit" control hardware resources may be identified based on necessary intercommunications between identified primary control hardware resources per the network topology.

Thus it is another object of the invention to provide for deterministic operation of those hardware resources required principally to support the distributed nature of the control system, for example, hardware resources that provide intercommunication between other hardware resources sharing the principal execution of the control application program. Such implicit resources are not solely dependent on the application program but also depend upon the allocation by the commitment program of the control application program to the various hardware resources.

The foregoing and other objects and advantages of the invention will appear from the following description. In the description, reference is made to the accompanying drawings which form a part hereof and in which there is shown by way of illustration a preferred embodiment of the invention. Such embodiment does not necessarily represent the full scope of the invention, however, and reference must be made to the claims herein for interpreting the scope of the invention.

BRIEF DESCRIPTION OF THE SEVERAL VIEWS OF THE DRAWINGS

FIG. 5 is a flow chart of the operation of the distributed real-time operating system code of FIG. 3 showing steps upon accepting a new application program to determine the low-level hardware resource requirements and to seek commitments from those hardware resources for the requirements of the new application program;

FIG. 6 is a detailed version of the flow chart of FIG. 5 showing the process of allocating low-level requirements to hardware resources; and FIG. 7 is a block diagram detailing the step of flow chart of FIG. 5 of responding to requests for commitment of hardware resources.

DETAILED DESCRIPTION OF THE INVENTION

Figure 1:
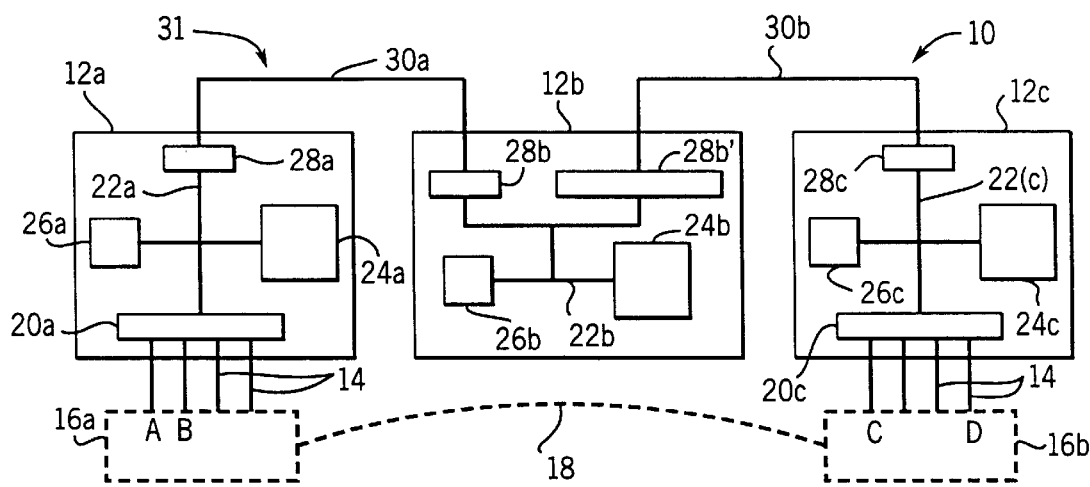
FIG. 1 is a simplified diagram of a distributed control system employing two end nodes and an intervening communication node and showing the processor, memory and communication resources for each node.

Referring now to FIG. 1, a distributed control system 10 includes multiple nodes 12a, 12b and 12c for executing a control program comprised of multiple applications. Control end nodes 12a and 12c include signal lines 14 communicating between the end nodes 12a and 12c and a portion of a controlled process 16a and 16b. Controlled process portions 16a and 16b may communicate by a physical process flow or other paths of communication indicated generally as dotted line 18.

In the present example, end node 12a may receive signals A and B from process 16a, and end node 12c may receive signal C from process 16b and provide as an output signal D to process 16b as part of a generalized control strategy.

End nodes 12a and 12c include interface circuitry 20a and 20c respectively communicating signals on signal lines 14 to internal buses 22a and 22c respectively. The internal buses 22a and 22c may communicate with the hardware resources of memory 24a, processor 26a and communications card 28a (for end node 12a) and memory 24c, processor 26c, and network communication card 28c for end node 12c. Network card 28a may communicate via network media 30a to a network card 28b on node 12b which may communicate via internal bus 22b to memory 24b and processor 26b and to second network communication card 28b' connected to media 30b which in turn communicates with network card 28c.

Generally during operation of distributed control system application programs are allocated between memories 24a, 24b and 24c to be executed on the respective nodes 12a, 12b and 12c with communications as necessary over links 30a and 30b. In an example control task it may desired to produce signal D upon the logical conjunction of signals A, B and C. In such a control task, a program in memory 24a would monitor signals A and B and send a message indicating both were true, or in this example send a message indicating the state of signals A and B to node 12c via a path through communication cards 28a, 28b, 28b' and 28c.

A portion of the application program executed by processor 26c residing in memory 24c would detect the state of input C and compare it with the state of signals A and B in the received message to produce output signal D.

The proper execution of this simple distributed application program requires not only the allocation of the application program portions to the necessary nodes 12a, 12b and 12c, but prompt and reliable execution of those programs the latter which requires the hardware resources of memory, processor, and communication networks 28a, 30a, 28b, 28b' 30b and 28c.

Figure 2:
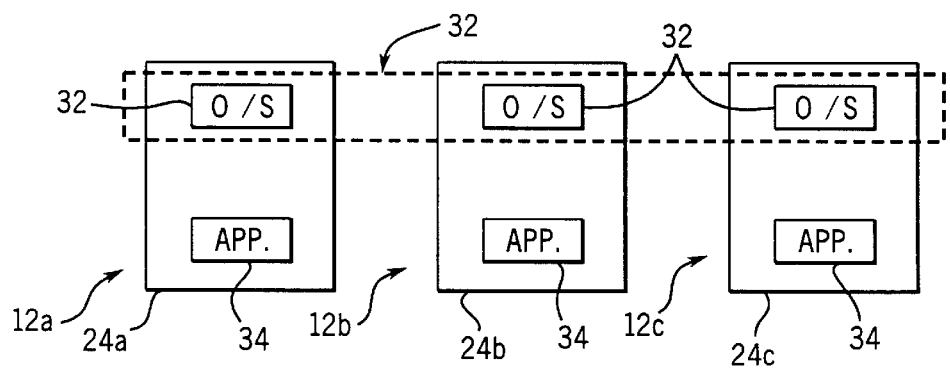
FIG. 2 is a block diagram showing the memory resources of each node of FIG. 1 as allocated to a distributed real-time operating system and different application programs.

Referring now to FIG. 2, for this latter purpose the distributed real-time operating system 32 of the present invention may be used such as may be centrally located in one node 12 or in keeping with distributed nature of the control system distributed among the nodes 12a, 12b and 12c. In the later case, the portions of the operating system 32 are stored in each of the memories 24a, 24b and 24c and intercommunicate to operate as single system. The operating system 32 provides multi-tasking in which multiple tasks including system tasks and application programs may be run in concurrent execution threads as is generally understood in the art.

In the preferred embodiment a portion of the operating system 32 that provides a modeling of the hardware resources (as will be described) is located in the particular node 12a, 12b and 12c associated with those hardware resources. Thus, hardware resource of memory 24a in node 12a would be modeled by a portion of the operating system 32 held in memory 24a.

In addition to portions of the operating system 32, memory 24a, 24b and 24c include various application programs 34 or portions of those programs 34 as may be allocated to their respective nodes.

Figure 3:
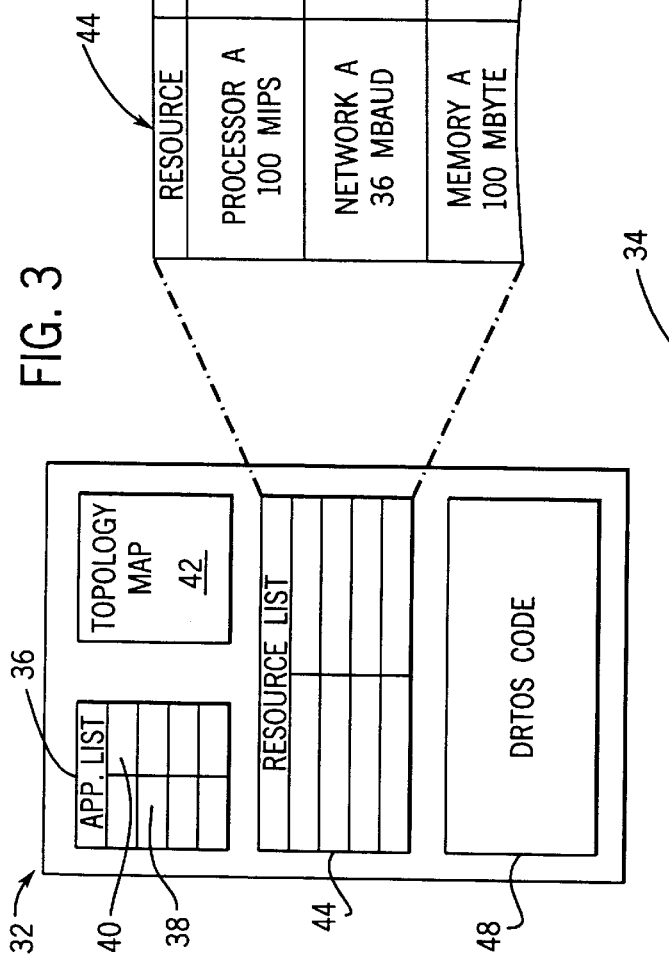
FIG. 3 is an expanded block diagram of the distributed operating system of FIG. 2 such as includes an application list listing application programs to be executed by the distributed control system, a topology showing the topology of the connection of the hardware resources of the nodes of FIG. 1, a resource list detailing the allocation of the hardware resources to the application program and the statistics of their use by each of the application programs, and the executable distributed real-time operating system code.

Referring now to FIG. 3, the operating system 32 collectively provides a number of resources for ensuring proper operation of the distributed control system 10. First, an application list 36 lists the application programs 34 that have been accepted for execution by the distributed control system 10. Contained in the application list 36 are application identifiers 38 and high-level requirements 40 of the application programs as will be described below.

A hardware resource list 44 provides (as depicted in a first column) a comprehensive listing of each hardware resource of the distributed control system 10 indicating a quantitative measure of that resource. For example, for the principle hardware resources of processors 26, networks 31 and memories 24, quantitative measurements may be provided in terms of millions of instructions per second (MIPs) for 15 processors 26, numbers of megabytes for memories 24 and megabaud bandwidth for networks. While these are the principal hardware resources and their measures, it will be understood that other hardware resources may also be enrolled in this first column and other units of measures may be used. Generally, the measures are of "bandwidth" a term encompassing both an indication of the amount of data and the frequency of occurrence of the data that must be processed.

A second column of the hardware resource list 44 provides an allocation of the quantitative measure of the resource of a particular row to one or more application programs from the application list 36 identified by an application name. The application name may match the application identifier 38 of the application list 36 and the indicated allocation quantitative measure will typically be a portion of the quantitative measure of the first column.

A third column of the hardware resource list 44 provides an actual usage of the hardware resource by the application program as may be obtained by collecting statistics during running of the application programs. This measure will be statistical in nature and may be given in the units of the quantitative measure for the hardware resource provided in the first column.

The operating system 32 also includes a topology map 42 indicating the connection of the nodes 12a, 12b and 12c through the network 31 and the location of the hardware resources of the hardware resource list 44 in that topology.

Finally, the operating system also includes an operating system code 48 such as may read the application list 36, the topology map 42, and the hardware resource list 44 to ensure proper operation of the distributed control system 10.

Figure 4:
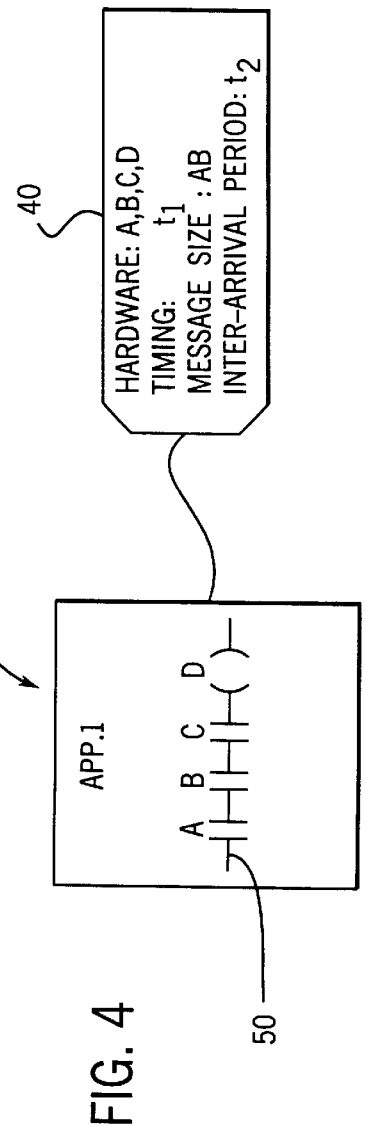
FIG. 4 is a pictorial representation of a simplified application program attached to its high-level requirements.

Referring now to FIG. 4, each application program enrolled in the application list 36 is associated with high-level requirements 40 which will be used by the operating system code 48. Generally, these high-level requirements 40 will be determined by the programmer based on the programmer's knowledge of the controlled process 16 and its requirements.

Thus, for the application described above with respect to FIG. 1 the application program 34 may include a single ladder rung 50 (shown in FIG. 4) providing for the logical ANDing of inputs A, B and C to produce an output D. The high-level requirements 40 would include hardware requirements for inputs and outputs A, B, C and D. The high-level requirements 40 may further include "completion-timing constraints" $t_1$ and indicating a constraint in execution time of the application program 34 needed for real-time control. Generally the completion-timing constraint is a maximum period of time that may elapse between occurrences of the last of inputs A, B and C to become logically true and the occurrence of the output signal D. This simple ladder logic program will be used to explain the operation of the present invention, however, it will be understood that the present invention is equally applicable to other types of application program languages such as function block languages in which timing signals and data are passed among function blocks.

The high-level requirements 40 may also include a message size, in this case the size of a message AB which must be sent over the network 31, or this may be deduced automatically through use of the topology map 42 and an implicit allocation of the hardware.

Finally, the high-level requirements 40 include an "inter-arrival period" $t_2$ reflecting an assumption about the statistics of the controlled process 16a in demanding execution of the application program 34. As a practical matter the inter-arrival period $t_2$ need be no greater than the scanning period of the input circuitry 20a and 20c which may be less than the possible bandwidth of the signals A, B and C but which will provide acceptable real-time response.

Referring now to FIG. 5, the operating system code 48 ensures proper operation of the distributed control system 10 by checking that each new enrolled application program 34 will operate acceptably with the available hardware resources. Prior to any new application program 34 being added to the application list 36, the operating system code 48 intervenes so as to ensure the necessary hardware resources are available and to ensure that time guarantees may be provided for execution of the application program.

At process block 56 the operating system code 48 checks that the high-level requirements 40 have been identified for the application program. This identification may read a prepared file of the high-level requirements 40 or may solicit the programmer to input the necessary information about the high-level requirements 40 through a menu structure or the like, or may be semiautomatic involving a review of the application program 34 for its use of hardware resources and the like. As shown and described above with respect to FIG. 4, principally four high-level requirements are anticipated, that of hardware requirements, completion-timing constraints, message sizes, and the inter-arrival period. Other high-level requirements are possible including the need for remote system services, the type of priority of the application, etc.

Referring still to FIG. 5, as indicated by process block 58, the high-level requirements 40 are used to determine low-level requirements 60. These low-level requirements may be generally "bandwidths" of particular hardware components such as are listed in the first column of the hardware resource list 44. Generally, the low-level requirements will be a simple function of high-level requirements 40 and the objective characteristics of the application program 34, the function depending on a priori knowledge about the hardware resource. For example, the amount of memory will be a function of the application program size whereas, the network bandwidth will be a function of the message size and the inter-arrival period $t_2$, and the processor bandwidth will be a function of the application program size and the inter-arrival period $t_2$ as will be evident to those of ordinary skill in the art. As will be seen, it is not necessary that the computation of the low-level requirements 60 be precise so long as it is a conservative estimate of low-level resources required.

The distinction between high-level requirements 40 and low-level requirements 60 is not fixed and in fact some high-level requirements, for example message size, may in fact be treated as low-level requirements as deduced from the topology map 42 as has been described.

Once the low-level requirements 60 have been determined, at process block 62, they are allocated to particular hardware elements distributed in the control system 10. Referring also to FIG. 6, the process block 62 includes sub-process block 63 where the low-level requirements abstracted at process block 58 are received. At process block 66 end nodes 12a and 12c are identified based on their hardware links to inputs A, B and C and output D and a tentative allocation of the application program 34 to those nodes and an allocation of necessary processor bandwidth is made to these principal nodes 12a and 12c. Next at process block 68, with reference to the topology map 42, the intermediary node 12b is identified together necessary network 31 and an allocation is made of network space based on message size and the inter-arrival period.

The burden of storing and executing the application program is then divided at process block 70, allocating to each of memories 24a and 24c (and possibly 12b) a certain of space for the application program 34 and to processors 26c and 26c (and possibly 26b) a certain amount of their bandwidth for the execution of the portions of the application program 34 based on the size of the application program 34 and the inter-arrival period $t_2$. Network cards 28a, 28b', 28b and 28c also have allocations to them based on the message size and the inter-arrival period $t_2$. Thus, generally the allocation of the application program 34 can include intermediate nodes 12b serving as bridges and routers where no computation will take place. For this reason, instances or portions of the operating system code 48 will also be associated with each of these implicit hardware resources.

There are a large number of different allocative mechanisms, however, in the preferred embodiment the application program is divided according to the nodes associated with its inputs per U.S. Pat. No. 5,896,289 to Struger issued Apr. 20, 1999 and entitled: "Output Weighted Partitioning Method For A Control Program In A Highly Distributed Control System" assigned to the same assignee as the present invention and hereby incorporated by reference.

During this allocation of the application program 34, the completion-timing constraint $t_1$ for the application program 34 is divided among the primary hardware to which the application program 34 is allocated and the implicit hardware used to provide for communication between the possibly separated portions of the application program 34. Thus, if the completion-timing constraint $t_1$ is nine milliseconds, a guaranty of time to produce an output after necessary input signals are received, then each node 12a–c will receive three milliseconds of that allocation as a time obligation.

At process block 72, a request for a commitment based on this allocation including the allocated time obligations and other low-level requirements 60 is made to portions of the operating system code 48 associated with each hardware element.

At decision block 64 portions of the operating system code 48 associated with each node 12a–c and their hardware resources review the resources requested of them in processor, network, and memory bandwidth and the allocated time obligations and reports back as to whether those commitments may be made keeping within the allocated time obligation. If not an error is reported at process block 66. Generally, it is contemplated that code portions responsible for this determination will reside with the hardware resources which they allocate and thus may be provided with the necessary models of the hardware resources by the manufacturers.

This commitment process is generally represented by decision block 64 and is shown in more detail in FIG. 7 having a first process block 74 where commitment request is received designating particular hardware resources and required bandwidths. At 20 process block 76 the portion of the operating system code 48 associated with the hardware element allocates the necessary hardware portion from hardware resource list 44 possibly modeling it as shown in process block 78 with the other allocated resources of the resource list representing previously enrolled application programs 34 to see if the allocation can be made. In the case of the static resources such as memory, the allocation may simply be a checking of the hardware resource list 44 to see if sufficient memory is available. In dynamic resources such as the processors and the network the modeling may determine whether scheduling may be performed such as will allow the necessary completion-timing constraints $t_1$ given the inter-arrival period $t_2$ of the particular application and other applications. Generally the modeling will take into account the priority of the tasks, the bandwidth required by the tasks and the expected arrival pattern of the tasks.

At the conclusion of the modeling and resource allocation, including adjustments that may be necessary from the modeling at process block 80, a report is made back to the other components of the operating system code 48. If that report is that a commitment may be had for all hardware resources of the high-level requirements 40 then the program proceeds to process block 82 instead of process block 66 representing the error condition as has been described.

At process block 82, a master hardware resource list 44 is updated and the application program is enrolled in the application list 36 to run.

During execution of the application program 34 and as indicated by process block 84, statistics are collected on its actual bandwidth usage for the particular hardware resources to which it is assigned and the actual arrival patterns. These are stored in the third column of the hardware resource list 44 shown in FIG. 3 and is shown in the block 45 associated with FIG. 5 and may be used to change the amount of allocation to particular application programs 34, indicated by arrow 86, so as to improve hardware resource utilization and modeling of that resource utilization.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

I claim:

1. A distributed real-time operating system for use with a control system having spatially separated control hardware resources arranged in a topology, the operating system comprising:

(a) an application list indicating control application programs, completion-timing constraints for the execution of the control application programs, and control hardware resources required by the control application programs;

(b) a resource list indicating control hardware resources and their allocation among control application programs;

(c) a commitment program executing to:
 (i) receive a new control application program;
 (ii) identify control hardware resources from the resource list matching control hardware resources required by the new control application program;

(iii) allocate a portion of the completion-timing constraint to each identified hardware resource;

(iv) for each of the identified control hardware resources, model execution of the new control application program with other control application programs on the application list to ensure the associated portion of the completion-timing constraints of the new control application program are met; and (v) enrolling the new control application program on the application list if all portions of the completion-timing constraints are met and otherwise reporting an error.

2. The distributed real-time operating system of claim 1 wherein the control application program provides an output signal to controlled equipment based on an input signal from controlled equipment and wherein the completion-timing constraints indicate a maximum elapsed time after occurrence of the input signal until production of the output signal.

3. The distributed real-time operating system of claim 1 wherein the commitment program models the execution of the new control application program with other control application programs on the application list based on a pre-determined pattern of repeated execution of the new application program and wherein the commitment program further:

(vi) collects statistics of the execution of the new application program during execution to modify the predetermined pattern of repeated execution for modeling with later new application programs.

4. The distributed real-time operating system of claim 1 wherein the resource list includes control hardware resources selected from the group consisting of:

processors, memory, and communication networks.

5. The distributed real-time operating system of claim 1 wherein the hardware resources may be shared by scheduling and wherein the resource list includes a scheduling of the hardware resource among control application programs and wherein the commitment program models the schedules of the control application programs.

6. The distributed real-time operating system of claim 1 wherein the modeling of the execution of the new control application program with other control application programs on the application list is for each hardware resource at a respective spatial location of the hardware resource.

7. A distributed real-time operating system for use with a control system having spatially separated control hardware resources arranged in a topology, the operating system comprising:

(a) an application list indicating control application programs and control hardware resources required by the control application programs;

(b) a network topology map indicating the topology of interconnections of the control hardware resources;

(c) a resource list indicating control hardware resources and their allocation among control application programs;

(d) a commitment program executing to:

(i) receive a new control application program;

(ii) identify primary control hardware resource from the resource list matching control hardware resources required by the new control application program;

(iii) identify implicit control hardware resource from the resource list required based on necessary intercommunication between the identified primary control hardware resource per the network topology;

(iv) allocate a portion of a completion-timing constraint to each identified primary and implicit control hardware resource;

(v) for each of the primary and implicit control hardware resource, model execution of the new control application program with other control application programs to ensure completion-timing constraints of the new control application program are met; and (vi) report acceptance of the new control application program only if completion-timing constraints are met.

8. The distributed real-time operating system of claim 7 wherein the control application program provides an output signal to controlled equipment based on an input signal from controlled equipment and wherein the completion-timing constraints indicate a maximum elapsed time after occurrence of the input signal until production of the output signal.

9. The distributed real-time operating system of claim 7 wherein the commitment program models the execution of the new control application program with other control application programs on the application list based on a pre-determined pattern of repeated execution of the new applications and wherein the commitment program further:

(vii) collects statistics of the execution of the new application program during execution to modify the predetermined pattern of repeated execution for modeling with later new application programs.

10. The distributed real-time operating system of claim 7 wherein the resource list includes control hardware resources selected from the group consisting of:

processors, memory, and communication networks.

11. The distributed real-time operating system of claim 7 wherein the hardware resources may be shared by scheduling and wherein the resource list includes a scheduling of the hardware resource among control application programs and wherein the commitment program models the schedules of the control application programs.

12. The distributed real-time operating system of claim 7 wherein the modeling of the execution of the new control application program with other control application program on the application list is for each hardware resource at a respective spatial location of the hardware resource.

* * * * *